(12) United States Patent  
Miyakawa

(10) Patent No.: US 10,126,856 B2  
(45) Date of Patent: Nov. 13, 2018

(54) INFORMATION PROCESSING APPARATUS, CONTROL METHOD FOR INFORMATION PROCESSING APPARATUS, AND STORAGE MEDIUM

(71) Applicant: CANON KABUSHIKI KAISHA, Tokyo (JP)

(72) Inventor: Takumi Miyakawa, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 95 days.

(21) Appl. No.: 14/710,406

(22) Filed: May 12, 2015

(65) Prior Publication Data

US 2015/0331536 A1 Nov. 19, 2015

(30) Foreign Application Priority Data

May 14, 2014 (JP) .................................. 2014-100842

(51) Int. Cl.
  *G06F 3/041* (2006.01)
  *G06F 3/0354* (2013.01)
  *G06F 3/0488* (2013.01)

(52) U.S. Cl.
  CPC .......... *G06F 3/0416* (2013.01); *G06F 3/0418* (2013.01); *G06F 3/0488* (2013.01); *G06F 2203/04108* (2013.01)

(58) Field of Classification Search
  None
  See application file for complete search history.

(56) References Cited

U.S. PATENT DOCUMENTS

| 2010/0225604 | A1* | 9/2010 | Homma | G06F 3/0414 345/173 |
| 2011/0175831 | A1* | 7/2011 | Miyazawa | G06F 3/041 345/173 |
| 2011/0175832 | A1* | 7/2011 | Miyazawa | G06F 3/041 345/173 |
| 2014/0176477 | A1* | 6/2014 | Nakao | G06F 3/0416 345/173 |
| 2016/0291842 | A1* | 10/2016 | Heo | G06F 3/0416 |

FOREIGN PATENT DOCUMENTS

| JP | 2013-88929 A | 5/2013 |
| JP | 2013-190862 A | 9/2013 |
| JP | 2013-225202 A | 10/2013 |

* cited by examiner

*Primary Examiner* — Benjamin C Lee
*Assistant Examiner* — Krishna Neupane
(74) *Attorney, Agent, or Firm* — Canon U.S.A., Inc. IP Division

(57) ABSTRACT

An information processing apparatus recognizes a touch operation input using a pointer, and the information processing apparatus includes a touch position acquisition unit configured to acquire a touch position in contact with the pointer on a target surface, a leading end position identifying unit configured to identify a position in proximity to a leading end part of the pointer on the target surface, an input position identifying unit configured to identify an input position, based on the touch position acquired by the touch position acquisition unit, and the position identified by the leading end position identifying unit as being corresponding to the leading end part of the pointer, and a recognition unit configured to recognize the touch operation, based on one or more input positions identified by the input position identifying unit.

11 Claims, 7 Drawing Sheets

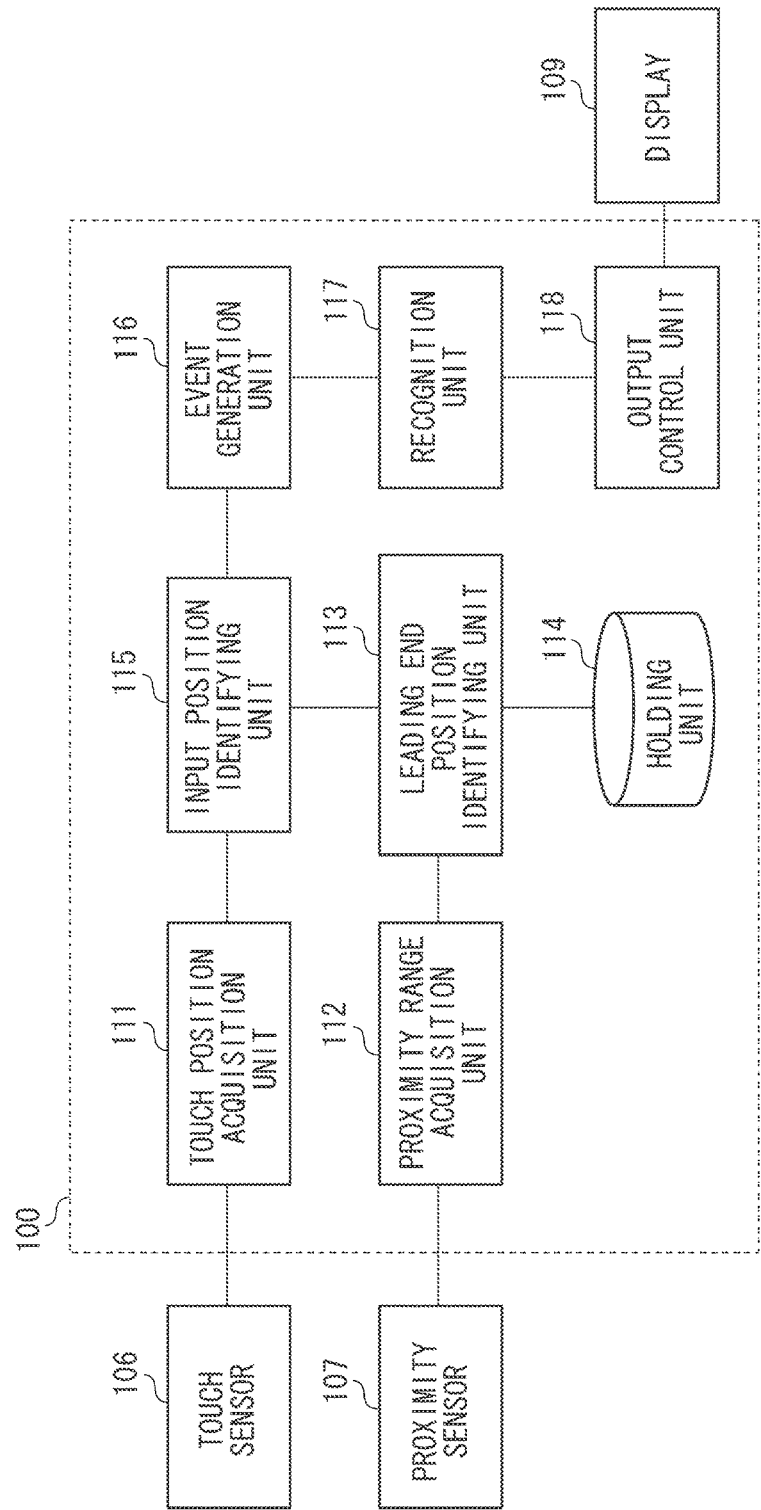

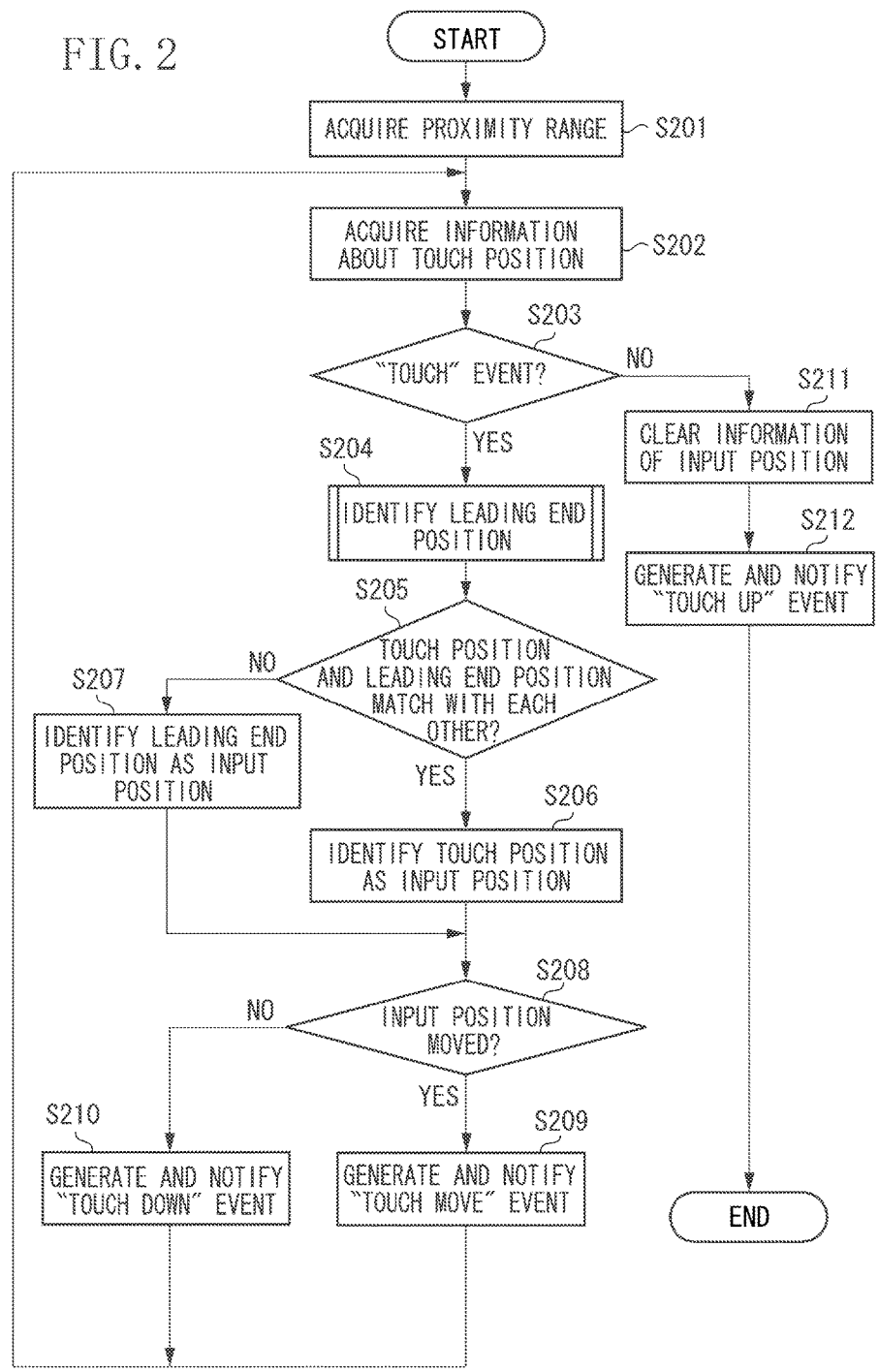

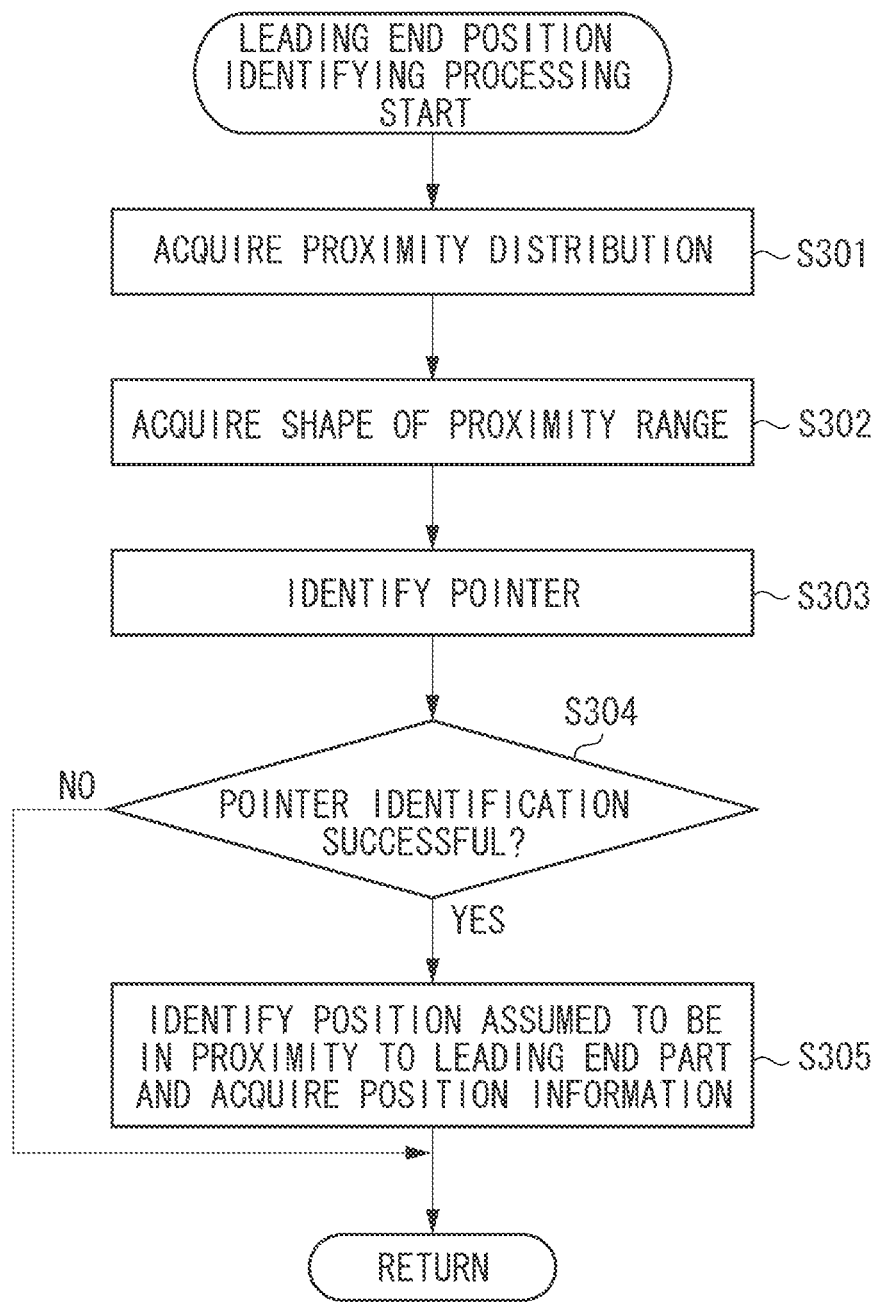

FIG. 5

| POINTER TYPE 501 | POINTER SHAPE 502 | PROXIMITY RANGE SHAPE REFERENCE 503 | TOLERANCE 507 |
|---|---|---|---|
| FINGER | | 506 ─ ▯ ─ 505, 504 | ±20% |
| STYLUS | | 506 ─ ▯ ─ 505, 504 | ±60% |

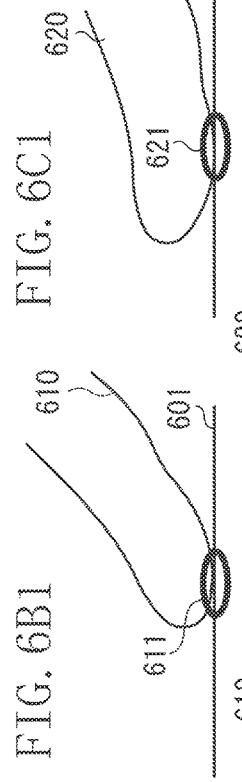
FIG. 6A1
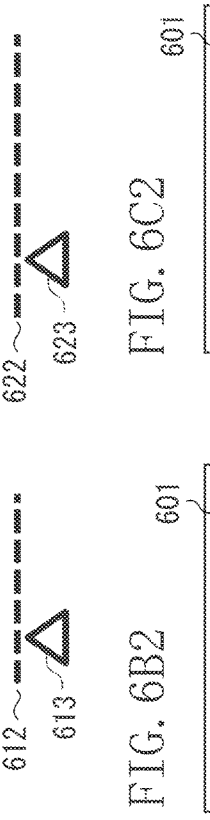
FIG. 6A2
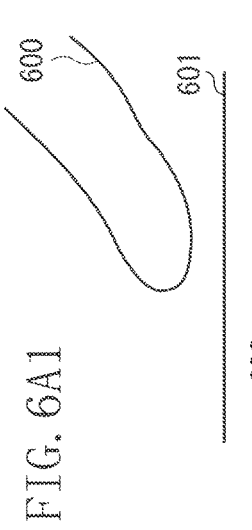
FIG. 6B1
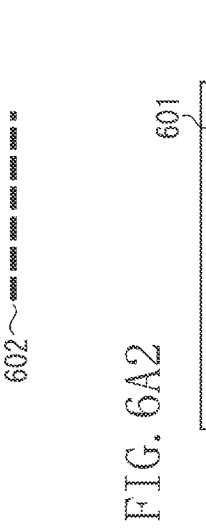
FIG. 6C1
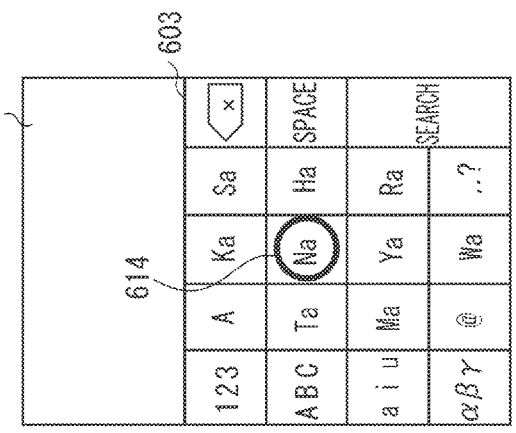
FIG. 6B2
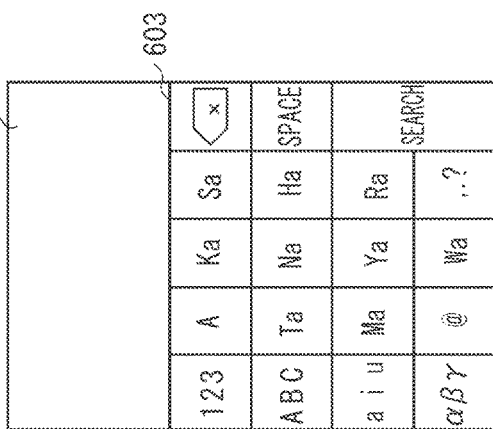
FIG. 6C2

INFORMATION PROCESSING APPARATUS, CONTROL METHOD FOR INFORMATION PROCESSING APPARATUS, AND STORAGE MEDIUM

BACKGROUND OF THE INVENTION

Field of the Invention

The present disclosure generally relates to information processing and, more particularly, to an information processing apparatus, a control method for an information processing apparatus, a storage medium, and a technique for recognizing a touch operation.

Description of the Related Art

In recent years, devices that execute various kinds of processing according to touch operations have become widespread. This type of device executes processing by recognizing a touch operation based on a touched position on a touch target surface such as a touch panel by a user's finger, a stylus, or the like (hereinafter, referred to as "pointer"). Widely used touch operations include an operation of touching an object displayed on a display serving as the touch target surface thereby designating the object, and an operation of inputting a command by moving a touched position according to a predetermined rule.

However, a position detected as a touch position on the touch target surface may not be necessarily a position contacted with the pointer by the user to perform a touch operation. Therefore, Japanese Patent Application Laid-Open No. 2013-88929 discusses a method for preventing misrecognition of an unintentional touch operation by a user within a touch invalid area provided in a touch target surface. A touch position detected within this touch invalid area is invalidated and thus is not recognized as an operation input.

Further, according to the method discussed in Japanese Patent Application Laid-Open No. 2013-190862, position information can be acquired when a pointer is in a pre-touch stage, i.e., in a state of being in proximity to a touch target surface (hereinafter, referred to as "proximity state"). The method discussed in Japanese Patent Application Laid-Open No. 2013-190862 utilizes this feature and enlarges a displayed object approached by the pointer while the pointer is in the proximity state, to present an easy-to-recognize touch operation to a user before the user performs a touch operation. This allows the user to make sure that an intended operation is to be performed.

SUMMARY OF THE INVENTION

According to an aspect of the present disclosure, an information processing apparatus recognizes a touch operation input using a pointer, and the information processing apparatus includes a touch position acquisition unit configured to acquire a touch position in contact with the pointer on a target surface, a leading end position identifying unit configured to identify a position in proximity to a leading-end part of the pointer on the target surface, an input position identifying unit configured to identify an input position, based on the touch position acquired by the touch position acquisition unit, and the position identified by the leading end position identifying unit as being corresponding to the leading end part of the pointer, and a recognition unit configured to recognize the touch operation, based on one or more input positions identified by the input position identifying unit.

Further features of the present disclosure will become apparent from the following description of exemplary embodiments with reference to the attached drawings.

BRIEF DESCRIPTION OF THE DRAWINGS

FIGS. 1A and 1B are block diagrams illustrating an example of a hardware configuration and an example of a functional configuration, respectively, of an information processing apparatus.

FIG. 2 is a flowchart illustrating an example of a flow of touch-event generation processing.

FIG. 3 is a flowchart illustrating an example of a flow of leading end position identifying processing.

FIG. 5 is a table illustrating an example of predetermined pointer information stored beforehand.

FIGS. 6A1, 6A2, 6B1, 6B2, 6C1, and 6C2 are diagrams each illustrating a flow of an operation example according to a first exemplary embodiment.

DESCRIPTION OF THE EMBODIMENTS

Embodiments of the present disclosure will be described hereinafter with reference to the accompanying drawings.

In many cases, a user performing touch operations touches a touch target surface, believing that the leading end of a pointer such as a finger is in contact with this surface. However, a touch sensor detects a touch position without determining whether the leading end of the pointer is in contact with the touch target surface. Therefore, when the pointer is in a shape having a curvature, the detected touch position may not be the leading end of the pointer. For example, when an object used as a pointer is a finger, a touch position may be detected based on contact of a finger pad, not of a fingertip. This may cause a problem that a position different from a desired location touched by a user is detected as a touch position, or an unintentional touch operation by the user is recognized.

To solve the above problem, the present disclosure is directed to a technique capable of performing a touch operation as desired by a user, by allowing the position of a leading end part of a pointer used for the touch operation, to be regarded as a touch position. In particular, the present invention is effectively utilized to address a problem that tends to occurs when a pointer has a curvature and thus has a bulging part other than a leading end part, like a finger.

An exemplary embodiment according to the present disclosure will be described in detail below with reference to the attached drawings. However, elements described in the present exemplary embodiment are mere examples and are not intended to limit the scope of the disclosure.

A first exemplary embodiment will be described using an example in which, when a pointer is brought into contact with a touch target surface, the shape of a part where the pointer is in proximity to the touch target surface is acquired. Based on this shape, a position assumed to be in proximity to the leading end of the pointer is determined, and the determined position is used to recognize a touch operation.

Figure 1A:
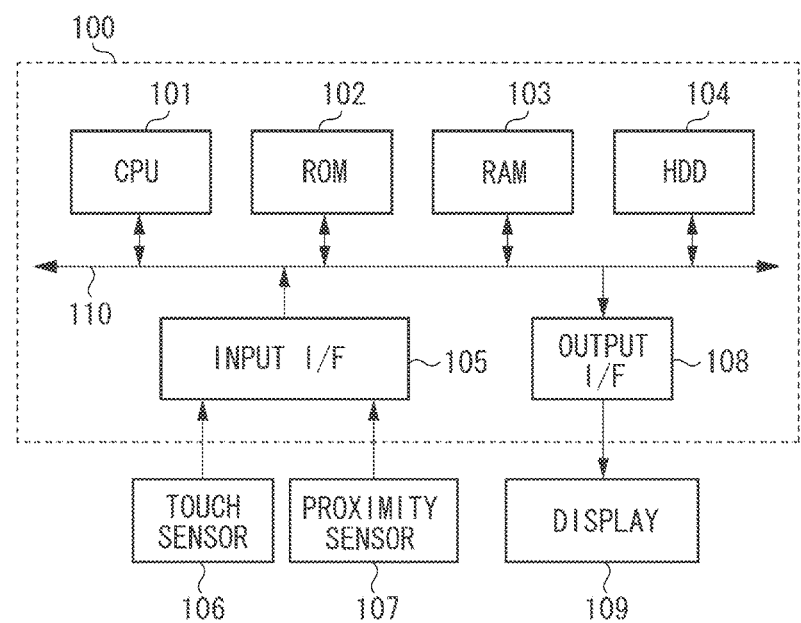

FIG. 1A is a diagram illustrating an example of a hardware configuration of an information processing apparatus 100 according to the present exemplary embodiment. A central processing unit (CPU) 101 performs arithmetic operations, logical decisions, and the like for various kinds of processing, to control each component connected to a system bus 110. The system bus 110 interconnects the components of the information processing apparatus 100, to allow exchange of information between the components. On the information processing apparatus 100, memories including a program memory and a data memory are mounted. A read-only memory (ROM) 102 is a program memory, and stores a program for control performed by the CPU 101, including various kinds of processing procedures, which will be described below. A random access memory (RAM) 103 is a data memory and includes areas such as a work area for the above-described program of the CPU 101, a save area for data in error handling, and a load area for the above-described program for the control. A program memory may be implemented by loading a program from a hard disk drive (HDD) 104 onto the RAM 103. In addition, an external storage connected via an interface may be used in place of the HDD 104. The external storage can be implemented by, for example, a medium (recording medium), and an external storage drive for an access to the medium. Known examples of such a medium include a flexible disk (FD), a compact disk read-only memory (CD-ROM), a digital versatile disk (DVD), a Universal Serial Bus (USB) memory, a magneto-optical (MO) disk, and a flash memory. Further, the external storage may be a server apparatus connected via a network. Information required in the present exemplary embodiment is stored beforehand in the ROM 102 and the HDD 104. As used herein, the term "unit" generally refers to any combination of software, firmware, hardware, or other component, such as circuitry, that is used to effectuate a purpose.

An input interface 105 acquires input signals from a touch sensor 106 and a proximity sensor 107, and notifies a system of these signals via the system bus 110. An output interface 108 outputs, at least, signals for controlling outputs resulting from execution of various kinds of processing, which will be described below, to a display 109. The touch sensor 106 detects a touch position on a touch target surface of an input unit and notifies the input interface 105 of the detected touch position. For the touch sensor 106, various touch panels can be used, including touch panels employing a resistive film method, an electrostatic capacitance method, an infrared ray method, an ultrasonic method, an acoustic wave method, and a vibration detection method. Moreover, position information defined on the touch target surface may be acquired by detecting contact on the touch target surface, by using a device capable of detecting a position in a three-dimensional space such as a range image sensor and a stereo camera. The proximity sensor 107 detects position information relative to the touch target surface and notifies the input interface 105 of the detected position information, even when the pointer is in proximity to the touch target surface (i.e., when the touch target surface and the pointer are not in contact with each other, but in proximity to each other). Such detection of the position of the pointer in a proximity state may be referred to as detection in a hover state, or hover position detection. For the proximity sensor 107, various touch panels can be used, including touch panels employing the electrostatic capacitance method, the infrared ray method, the ultrasonic method, and the acoustic wave method. Further, detection of position information of the pointer in proximity to the touch target surface may be allowed by increasing sensitivity of the touch sensor 106. However, in this case, position information detected as a touch position and position information detected as a position of the pointer in a proximity state are acquired so as to be distinguished from each other. Moreover, for the proximity sensor 107, there may be adopted a system that detects a position of the pointer in a three-dimensional space by using a range image sensor or a stereo camera, to detect a position of the pointer in a state of being away from the touch target surface.

The display 109 displays results of executing various kinds of processing performed in the information processing apparatus 100. Examples of the display 109 include a liquid crystal display, a television monitor, and a projector. In the present exemplary embodiment, a touch panel employing the electrostatic capacitance method is used for each of the touch sensor 106 and the proximity sensor 107, and arranged so as to overlap a display screen of a liquid crystal display serving as the display 109. In other words, a touch panel surface provided on a display surface of the display 109 corresponds to the touch target surface. The touch panel serving as the touch sensor 106 identifies a surface where the pointer and the touch panel surface are in contact with each other, and identifies coordinates of one point on the identified surface as a touch position. This touch panel then notifies the information processing apparatus 100 of the identified coordinates. The touch panel serving as the proximity sensor 107 assumes a part where a change in electrostatic capacity is relatively small as compared with a contact part, to be an area not in contact with, but in proximity to the pointer (in a state of hovering slightly above the touch target surface). This touch panel then notifies the information processing apparatus 100 of position information indicating a range of this area, together with information indicating a proximity degree (how long the distance between the pointer and the touch panel is) at each point within this area. The information processing apparatus 100 may be notified of signals collectively output from a single touch panel, instead of being notified of the signals output respectively from the touch sensor 106 and the proximity sensor 107. A touch panel-equipped display integrating a touch panel and a display may be used.

FIG. 1B is a block diagram illustrating an example of a functional configuration of the information processing apparatus 100 according to the present exemplary embodiment. The CPU 101 executes processing according to each flowchart described below, by reading a program stored in the ROM 102 and loading the read program onto the RAM 103, so that each function unit described below is implemented. The present disclosure can be similarly implemented by using an information processing apparatus that implements these function units with hardware. Each component, i.e., each function unit, will be described below.

A touch position acquisition unit 111 acquires information about a touch position detected on the touch target surface, based on an input signal notified from the touch sensor 106. The information about the touch position includes at least a touch event, and position information. The touch event is information indicating a type of the notified touch information. In the present exemplary embodiment, an event "TOUCH" is notified at the time of notifying touch information corresponding to new contact or continuous contact of the pointer on the touch panel surface. In other words, when the notified event is "TOUCH", the pointer is brought into contact with the touch target surface. Further, an event "RELEASE" is notified at the time of notifying touch information corresponding to separation (release) of the pointer from the touch panel. In other words, when the touch event is "TOUCH", notified information includes coordinate information indicating a touch position touched by the pointer. When the touch event is "RELEASE", the pointer is not in contact with the touch panel surface, and therefore, information indicating a touch position is not acquired. In the present exemplary embodiment, the information about the touch position acquired by the touch position acquisition unit 111 further includes information indicating the time when the touch position or the touch event is acquired, and identification (ID) for identifying the touch position. It is easier to manage information, when a plurality of touch positions is acquired, by using an identifier associated with the detected order of the touch positions, for the ID. In the present exemplary embodiment, the touch position acquisition unit 111 acquires the latest information of the touch position, based on the ID. When there is a difference between the currently acquired position information and the previously acquired position information for the touch position of the identical ID, the touch position acquisition unit 111 can recognize a movement of this touch position based on this difference. However, the touch position acquisition unit 111 may be adapted to an acquisition system that notifies a touch event "MOVE" at the time of notifying touch information corresponding to a case where the currently acquired position is different from the previously acquired position for the identical ID.

A proximity range acquisition unit 112 acquires information indicating position coordinates of each of one or more points where an object is detected as being in proximity to the touch target surface, as well as indicating a proximity degree at each of the one or more points, based on an input signal notified from the proximity sensor 107. Based on the information acquired by the proximity range acquisition unit 112, a leading end position identifying unit 113 identifies a position assumed to be in proximity to the leading end part of the pointer, within a range in which the object is in proximity to the touch target surface, thereby acquiring position information of the identified position. In this process, the leading end position identifying unit 113 identifies which one of the positions of the predetermined pointer is in the vicinity of the range acquired by the proximity range acquisition unit 112, and determines the position at which the leading end position is likely to be in the vicinity thereof, by referring to pointer-shape information stored beforehand in a holding unit 114. The leading end position identifying unit 113 thus identifies the position assumed to be in proximity to the leading end of the pointer. An input position identifying unit 115 identifies either the touch position acquired by the touch position acquisition unit 111, or the position identified by the leading end position identifying unit 113 and assumed to be in proximity to the leading end of the pointer, as an input position input by the user. In the present exemplary embodiment, in particular, if these information items do not match with each other when the touch position is detected, the input position identifying unit 115 identifies the leading end position (the position assumed to be in proximity to the leading end of the pointer) identified based on the proximity range, as the input position. An event generation unit 116 generates a touch event, by tracking the input position identified by the input position identifying unit 115. In the present exemplary embodiment, the touch event generated by the event generation unit 116 is equivalent to a result of correcting the touch event notified from the touch sensor 106. The event generation unit 116 generates any of "TOUCH DOWN" indicating that the pointer is in contact with the touch target surface, "TOUCH MOVE" indicating that the pointer has moved while keeping a touch, and "TOUCH UP" indicating that the pointer has been separated from the touch target surface. Each of "TOUCH DOWN" and "TOUCH MOVE" is associated with the position information of the input position, and then notified to a recognition unit 117. At the time when "TOUCH UP" is generated, an input position is not acquired. Therefore, when "TOUCH UP" is notified, position information is not provided. Further, "TOUCH DOWN" may be generated by being distinguished from "TOUCH ON" indicating start of a touch. The present exemplary embodiment is described using different names for these events to distinguish them from the events notified from the touch sensor 106, but any terms may be used as long as the states indicated by the respective events can be distinguished from each other.

The recognition unit 117 recognizes a type of an input touch operation, by determining whether a movement direction, a moving speed, and the like of the input position meet predetermined conditions, based on the touch event and the position information notified from the event generation unit 116. For example, the recognition unit 117 recognizes a single tap, a double tap, a triple tap, a swipe (sweep operation in a specific direction on the touch panel surface), a flick (operation of quickly moving the pointer on the touch panel surface and releasing the pointer), and the like, for one or more operation objects. The recognition unit 117 then notifies an application and the like of a result of this recognition. For the touch operation, an output control unit 118 controls each function unit of the information processing apparatus 100 to respond to the input operation. In the present exemplary embodiment, the output control unit 118 generates at least an image reflecting a response by the application to an operation content notified from the event generation unit 116, and outputs the generated image to the display 109 serving as an output unit, so that the display 109 displays this image.

FIG. 2 is a flowchart illustrating an example of a flow of touch-event generation processing performed by the information processing apparatus 100 according to the present exemplary embodiment. The processing of the flowchart of FIG. 2 starts in response to notification from the input interface 105, of information indicating a touch input detected by the touch sensor 106, or information indicating a proximity range detected by the proximity sensor 107.

First, in step S201, the proximity range acquisition unit 112 starts acquiring information, based on an input signal notified from the proximity sensor 107, to acquire a proximity range. This information includes information indicating a position of each of one or more points at which an object is detected in proximity to the touch target surface, and information indicating a proximity degree at each of these positions. Afterward, the proximity range acquisition unit 112 repeats a process for acquiring the latest information and storing the acquired information in the RAM 103 in a predetermined cycle, regardless of stages of the current processing. When a pointer detected as being in proximity to the touch panel surface becomes not in proximity to the touch panel surface immediately after the previous detection, the proximity range acquisition unit 112 acquires a release notification from the input interface 105. When this notification is acquired, the pointer is sufficiently away from the touch target surface (out of a detectable range). When there is no pointer in proximity to the touch panel surface (including a case where the pointer is in contact with the touch panel surface), no information indicating a proximity position is notified from the proximity sensor 107. Therefore, the proximity range acquisition unit 112 acquires no proximity position.

In step S202, the touch position acquisition unit 111 acquires information about a touch position. The touch position acquisition unit 111 according to the present exemplary embodiment acquires at least coordinate information indicating the touch position, and a touch event, based on information detected by the touch sensor 106. The touch position acquisition unit 111 repeats this acquisition of information in a predetermined cycle corresponding to a detection cycle of a touch position by the touch sensor 106. The touch position acquisition unit 111 stores the acquired information in the RAM 103. In the present exemplary embodiment, the RAM 103 holds information when a touch position of a certain identification (ID) is acquired first and information when this touch position is acquired last. Therefore, when position information different from position information stored last in the RAM 103 is acquired for a touch position of an ID that has been already acquired, this touch position is assumed to be moved. In this case, the touch position acquisition unit 111 updates the information acquired last and held in the RAM 103, with the newly acquired information, for this touch position. In the present exemplary embodiment, when the touch position acquisition unit 111 cannot acquire an input signal indicating a touch position from the touch sensor 106 during a predetermined time after the start of the process in step S202, there is no touch. Therefore, the flowchart ends without performing subsequent processes.

In step S203, the touch position acquisition unit 111 determines whether the touch event acquired in step S202 is "TOUCH". When the touch position acquisition unit 111 determines that the touch event is "TOUCH" (YES in step S203), the processing proceeds to step S204. When the touch position acquisition unit 111 determines that the touch event is not "TOUCH", i.e., the touch event is "RELEASE" (NO in step S203), the processing proceeds to step S211. In other words, the process in step S204 begins in response to contact of the pointer on the touch target surface.

In step S204, the leading end position identifying unit 113 identifies a position assumed to be in proximity to the leading end of the pointer, within a range in proximity to the object on the touch target surface, based on the proximity range acquired by the proximity range acquisition unit 112. Here, details of leading end position identifying processing to be executed in step S204 is described with reference to a flowchart of FIG. 3.

In step S301, the leading end position identifying unit 113 acquires distribution of the proximity degrees at the positions of one or more points at which the object is detected in proximity to the touch target surface, by referring to the latest information stored in the RAM 103 by the proximity range acquisition unit 112. Here, the latest information is information that indicates the range in proximity to the object at the time when the touch position is acquired in step S202, and the proximity degrees at the respective points in this range. In step S302, the leading end position identifying unit 113 acquires the shape of the proximity range, based on the distribution of the proximity degrees. In other words, the leading end position identifying unit 113 acquires an outline of the pointer projected on a two dimensional plane parallel to the touch target surface, as the shape of the proximity range, by correcting a faint part where the proximity degree is low (where the object is away from the touch target surface).

In step S303, the leading end position identifying unit 113 identifies the pointer in proximity to the touch target surface, based on the shape of the proximity range acquired in step S302. In the present exemplary embodiment, the holding unit 114 holds beforehand shape information of one or more types of predetermined pointers. The leading end position identifying unit 113 compares the shape of the proximity range with the shapes of the predetermined pointers, thereby identifying the pointers that can be regarded as identical. Details will be described below. In step S304, the leading end position identifying unit 113 determines whether the identification of the pointer in step S303 is successful. When the leading end position identifying unit 113 determines that the identification of the pointer is successful (YES in step S304), the processing proceeds to step S305. When the leading end position identifying unit 113 determines that the identification of the pointer is not successful (NO in step S304), the processing returns to the flowchart of FIG. 2, without identifying position information, assuming that no leading end position is identified.

In step S305, the leading end position identifying unit 113 identifies a position (leading end position) assumed to be in proximity to the leading end of the pointer, based on the shape of the proximity range acquired in step S302. The leading end position identifying unit 113 then acquires position information of the leading end position and stores the acquired position information in the RAM 103. The processing then returns to the flowchart of FIG. 2.

Referring back to FIG. 2, in step S205, the input position identifying unit 115 determines whether the touch position acquired in step S202 and the leading end position identified in step S204 match with each other. Here, cases where these positions "match" with each other include, not only a case where these positions are identical in terms of coordinate, but also a case where a difference between these positions falls within a predetermined tolerance. When the input position identifying unit 115 determines that the leading end position and the touch position match with each other (YES in step S205), the processing proceeds to step S206. When the input position identifying unit 115 determines that the leading end position and the touch position do not match with each other (NO in step S205), the processing proceeds to step S207.

In step S206, the input position identifying unit 115 identifies the position information indicating the touch position acquired in step S202, as an input position input by a user. The input position identifying unit 115 stores the identified position information in the RAM 103, in association with the ID, similar to the touch position. In step S207, the input position identifying unit 115 identifies the position information of the leading end position identified in step S204, as an input position input by the user. The input position identifying unit 115 then stores the identified position information in the RAM 103. In the present exemplary embodiment, similarly to the touch position, the RAM 103 holds information when an input position is identified first and information when this input position is identified last. When position information different from position information stored last in the RAM 103 is acquired for an input position of an ID associated with information already stored, this input position is assumed to be moved. In this case, in the present exemplary embodiment, the input position identifying unit 115 updates the information acquired last and held in the RAM 103, with the newly acquired information, for this input position, so that the value of a movement flag indicating the movement of the input position is changed to "1" in the RAM 103. The value of the movement flag is assumed to be "0", immediately after a touch for a certain ID begins, and, while a movement or a release of the input position is not detected. However, the method of holding information indicating the moved input position is not limited to that of using such a movement flag.

In step S208, the event generation unit 116 determines whether the input position is moved. In the present exemplary embodiment, the event generation unit 116 makes this determination by referring to the value of the movement flag held in the RAM 103. When the event generation unit 116 determines that the input position is moved (YES in step S208), the processing proceeds to step S209. When the event generation unit 116 determines that the input position is not moved (NO in step S208), the processing proceeds to step S210.

In step S209, the event generation unit 116 generates an event "TOUCH MOVE" and notifies the recognition unit 117 of this event. At the time, this event is associated with the ID of the input position and the latest position information of the input position. In step S210, the event generation unit 116 generates an event "TOUCH DOWN", and notifies the recognition unit 117 of this event. At the time, this event is also associated with the ID of the input position and the latest position information of the input position. The recognition unit 117 recognizes a touch operation based on the notified event, and notifies the application and the output control unit 118 of a result of this recognition as a user input. Upon completion of the notification of the event, the processing returns to step S202 to repeat the above-described processes. Therefore, the processes from step S202 to step S210 are repeated in a predetermined cycle in which the information about the touch position is acquired in step S202. As a result, the touch operation is configured using the information of the input position held in the RAM 103 and the notified event, and the recognition unit 117 recognizes this touch operation. The output control unit 118 then presents a response to the recognized operation, to the user.

On the other hand, if the touch event acquired in step S202 is not "TOUCH", i.e., if this touch event is "RELEASE" (NO in step S203), then in step S211, the input position identifying unit 115 clears the information of the input position held in the RAM 103. However, this is not a limiting configuration in a case where the recognition unit 117 can recognize an operation such as a double tap, which is a single operation including some steps such as a step of releasing a pointer once from the touch target surface. In step S212, the event generation unit 116 generates an event "TOUCH UP", and notifies the recognition unit 117 of this event. At the time, this event is associated with the ID of the input position. Upon completion of the notification of the event, the processing in the flowchart of FIG. 2 ends.

Figure 4A:
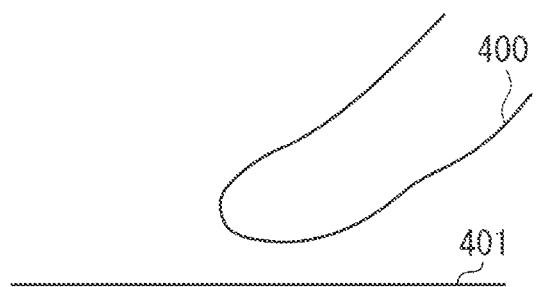
FIGS. 4A, 4B, and 4C are diagrams illustrating a proximity range and a shape acquired when a pointer is a finger, by way of example.
Figure 4B:
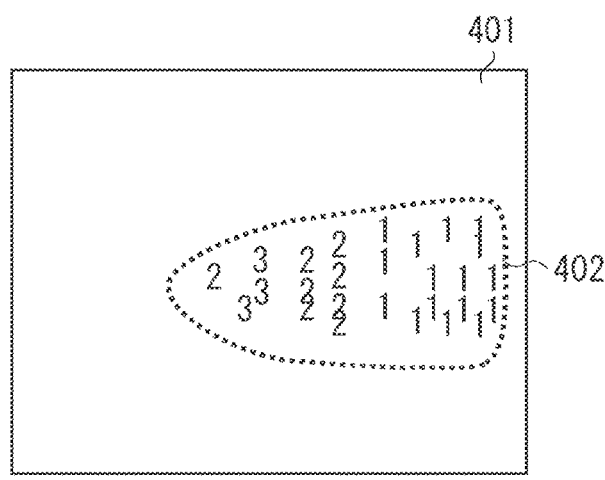
Figure 4C:
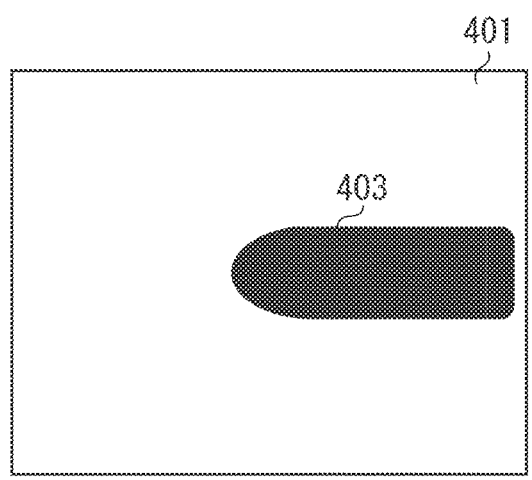

Here, a specific example related to the processes in step S302 and step S303 will be described with reference to FIGS. 4A, 4B, 4C, and 5. FIG. 4A illustrates a state where a pointer 400 (assuming this is a finger of a person) is in proximity to an input surface 401. FIG. 4B illustrates the distribution of the proximity degrees acquired in step S301, in the state of FIG. 4A. Each value distributed within an area 402 represents the size of a capacitance detected at each point, and is indicated simply as one of values in three levels. In a part where a distance between the input surface 401 and the pointer 400 is short, the size of the capacitance is large and the proximity degree is high. Therefore, this part is indicated by a larger number. On the other hand, in a part where a distance between the input surface 401 and the pointer 400 is long, the proximity degree is low, and therefore, this part is indicated by a smaller number. FIG. 4C illustrates the shape of the proximity range acquired in step S302, in the state of FIG. 4A likewise. An area 403 is the proximity range of the pointer 400, which is projected on a two dimensional plane parallel to the touch target surface, and this proximity range is acquired by correcting a faint part where the proximity degree is low, from the capacitances distributed in FIG. 4B. FIG. 5 is a table in which the type and shape of each predetermined pointer and the shape of a proximity range for this pointer are associated with a tolerance used for comparison. In the present exemplary embodiment, this table is stored beforehand in the holding unit 114. As examples of a pointer type 501, "STYLUS" and "FINGER" are defined. In FIG. 5, a pointer shape 502 is illustrated to indicate the pointer type clearly. However, the pointer shape held in the holding unit 114 may not necessarily be the shape of the pointer. A proximity range shape reference 503 is information of a reference shape to be compared with the shape of the proximity range in step S303. Of the shape acquired as the shape of the proximity range, the lengths and ratios of a vertical size 504, a lateral size 505, and a leading end position offset 506 are designated beforehand. Based on this information, the leading end position identifying unit 113 identifies which position corresponds to the leading end part, after the shape of the proximity range is acquired. In a tolerance 507, an acceptable error range for absorbing individual differences of the pointers and sensor detection differences is defined. In step S303 in the present exemplary embodiment, the size of the proximity range acquired in step S302 is compared with the proximity range shape reference 503 defined in the table of FIG. 5. If a difference resulting from this comparison falls within the tolerance 507, the corresponding type is identified as the type of the pointer.

In the example of FIGS. 4A, 4B, 4C, and 5, the shape of the area 403 is compared with the shapes of the respective pointer types, to determine which one of the pointer types, "FINGER" and "STYLUS", defined in Table of FIG. 5 corresponds to the shape (area) 403 of the proximity range acquired in step S302. Assume that, in this process, the ratio between the vertical and lateral sizes of the shape 403 of the proximity range does not fall within the tolerance of "STYLUS", while all indexes fall within the tolerance of "FINGER". In this case, the pointer is identified as "FINGER".

Next, an operation example in which the present disclosure is applied to an application for entering characters with a software keyboard in the form of a numeric keypad (hereafter simply referred to as a numeric-keypad application) will be described with reference to FIGS. 6A1, 6A2, 6B1, 6B2, 6C1, and 6C2. In this example, each of pointers 600, 610, and 620 is a finger of a user. Illustrated here is how the finger moves to perform a flick operation after gradually approaching a touch target surface 601. Further, broken lines 602, 612, and 622 each indicate the position of a part, in which proximity of the pointer is detected by the proximity sensor 107, of the touch target surface 601 (note that these broken lines are each illustrated at a position slightly below the touch target surface 601 for easy understanding of the illustration).

FIG. 6A1 illustrates a state of the pointer 600 being in proximity to the touch target surface 601 that is horizontally placed. Further, FIG. 6A2 illustrates a displayed image of the numeric-keypad application output to the display 109, in this state. At the time, the pointer 600 is detected as being in proximity to the touch target surface 601 (step S201), but since there is no touch, both a touch position and an input position are absent on the touch target surface 601.

FIGS. 6B1 and 6B2 illustrate a state of the pointer 610 touching the touch target surface 601. In this state, the proximity range acquisition unit 112 acquires a part indicated by the broken line 612 as a proximity range of the pointer (step S201). The touch sensor 106 detects contact of the pointer 610 by using a part indicated by a circle 611, and the touch position acquisition unit 111 acquires coordinates of a gravity center or a center of the range of this contact, as a touch position (step S202). At the time, a part indicated by the broken line 612 is a proximity range, and the leading end of this part is a part indicated by a triangle 613. Therefore, the leading end position identifying unit 113 identifies representative coordinates of the part indicated by the triangle 613 as a leading end position (step S204). When the user touches the touch target surface by using the leading end of the finger as illustrated in FIG. 6B1, the position of the circle 611 and the position of the triangle 613 substantially match with each other. Therefore, a touch position is identified as an input position (step S206), and the event generation unit 116 notifies the recognition unit 117 of an event "TOUCH DOWN" (step 210). In this way, the information processing apparatus 100 recognizes the touch operation performed by the user with the leading end of the finger. FIG. 6B2 illustrates a display state of the numeric-keypad application, in this state. In FIG. 6B2, a circle 614 indicates a part corresponding to the circle 611. At this moment, the user is in contact with the position of "Na", and therefore, a numeric-keypad application screen is changed to the display state illustrated in FIG. 6B2, by processing of the recognition unit 117 and the output control unit 118.

FIG. 6C1 illustrates a state where a flick is performed by the user's finger, after the state of FIG. 6B1. The flick is a motion of releasing the finger from the touch panel surface after quickly moving the finger on the touch panel surface. In FIG. 6C1, the leading end of the user's finger is moved leftward. As a result, a part of the user's finger pad remains in contact with the touch target surface 601, although the leading end of the finger is already away from the touch target surface 601. This state occurs when, for example, a flick is made with a thumb outward of a palm, and the thumb bends backwards relative to a screen so that a fingertip is away from the screen. Here, the position of a touched part indicated by a circle 621 detected by the touch sensor 106 is not substantially changed from the position of the part indicated by the circle 611 in FIG. 6B1 (step S202). On the other hand, the proximity range acquisition unit 112 acquires the part indicated by the broken line 622 as a proximity range, and therefore, a leading end position of this part indicates representative coordinates of the part indicated by a triangle 623 (step S204). Although the touch position is detected (YES in step S203), the touch position and the leading end position do not match with each other (NO in step S205). Therefore, in this case, the leading end position is identified as an input position according to the present exemplary embodiment (step 207). Because there is a movement from the immediately preceding input position to the current input position, the event generation unit 116 notifies the recognition unit 117 of an event "TOUCH MOVE" (step 209). FIG. 6C2 illustrates a display state of the numeric-keypad application in this state. In FIG. 6C2, a circle 624 indicates a part corresponding to the circle 621. In this state, actually, the user keeps touching the position of "Na". However, in the present exemplary embodiment, the position of a triangle 625 corresponding to the triangle 623 is the input position and therefore, the user can recognize that the touch position is moved to the position of "Ni". At this moment, the contact made by the user to input the flick operation is finished, and afterward, the user's finger is further away from the touch target surface. When the finger becomes sufficiently distant, "TOUCH UP" is notified and the flick operation is recognized as intended by the user.

In the first exemplary embodiment described so far, when a touch of a pointer on the touch target surface is detected, and a touch position and a leading end position do not match with each other, the position of a part assumed to be in proximity to a leading end part of the pointer is identified as an input position. Therefore, in a situation where a leading end part certainly touches the touch target surface, a difference from the touch position visually recognizable by the user can be suppressed by using a touch position as much as possible. However, this is not a limiting configuration. For example, a leading end position assumed to be in proximity to a leading end part of a pointer may be always identified as an input position, while a touch of the pointer on the touch target surface is kept being detected. In this case, it is possible to suppress slight shifting in coordinates that tends to occur when a position to be identified as an input position changes from a touch position to a leading end position or from a leading end position to a touch position. Further, for example, when a touch position is kept detected (acquired) and it is determined that a leading end position is moved from a position matching with the touch position, a position assumed to be in proximity to a leading end part of a pointer may be identified as an input position. This determination is made by referring to a history of each of the touch position and the leading end position. In such a situation, despite a user initially making a touch by using the leading end of the pointer, the touch position and the leading end position do not match with each other. However, the user is highly likely to keep performing a touch operation by using the leading end of the pointer. Therefore, when it is determined a situation falls into such a case, the leading end position is recognized as an input position of the touch operation, so that the user can continuously track the input. Therefore, it is easy to recognize an operation intended by the user. Further, at the time, it is also possible to determine whether the touch position is kept detected at substantially the same position. In that case, it is easy to recognize an operation intended by a user, particularly when misrecognition easily occurs, e.g., when a movement of a pointer such as a finger is not detected although the user believes the movement is made, as illustrated in FIGS. 6C1 and 6C2.

As described above, in the present exemplary embodiment, while the touch on the touch target surface is kept being detected, the leading end position of the pointer used for this touch is tracked, and used as the input position of the touch operation. This can improve accuracy of recognition of the touch operation performed using the leading end part of the pointer.

In the first exemplary embodiment described above, after the information of the proximity range representing the shape of the pointer is acquired using the proximity sensor, the leading end position corresponding to the leading end part of the proximity range is identified. However, the method of identifying the leading end position is not limited to this example. For example, when a system of detecting a pointer in a three-dimensional space based on an image acquired by a range image sensor, a stereo camera, or the like is used, a position with which a physical end part of the pointer overlaps, on a touch target surface is identified as a leading end position. Examples of the physical end part of the pointer include the tip of a fingernail. A proximity sensor that employs the electrostatic capacitance method does not detect a nail part as a proximity range, whereas a sensor that employs a method for detecting a pointer based on an image detects a nail part as a part of a finger as well. In addition, if the nail has a characteristic color or shape, the position of the nail alone may be identifiable. Either of these methods may be used for identifying a leading end position, and the present exemplary embodiment is applicable to either case.

According to the exemplary embodiment of the present disclosure, the position of a leading end of a pointer used in a touch operation can be assumed to be a touch position, and therefore, the touch operation can be performed as intended by a user.

Embodiments of the present disclosure can also be realized by a computer of a system or apparatus that reads out and executes computer executable instructions recorded on a storage medium (e.g., a non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2014-100842 filed May 14, 2014, which is hereby incorporated by reference herein in its entirety.

What is claimed is:

1. An information processing apparatus configured to recognize an object operated using a pointer, the information processing apparatus comprising:
a touch position acquisition unit configured to detect and acquire, using a touch sensor, a touch position in contact with the pointer on a target surface;
a leading end position identifying unit configured to identify, using a proximity sensor acquiring a sensed shape of the pointer, a surface position on the target surface in proximity to but not touching a leading end part of the pointer on the target surface, based on a target surface position having a closest proximity to the pointer or a predetermined shape portion of the sensed shape;
an input position identifying unit configured to identify the surface position identified by the leading end position identifying unit as an input position, based on the surface position being identified away from or coinciding with the touch position after the touch position is acquired by the touch position acquisition unit in a state during which a touch with the pointer on the target surface remains detected for a determined time; and
a recognition unit configured to recognize and select an object at the input position, based on the input position identified by the input position identifying unit, and
wherein each unit is implemented by one or more processors, circuitry or a combination thereof.

2. The information processing apparatus according to claim 1, wherein the input position identifying unit identifies the surface position, as an input position of a touch operation, while the touch position remains detected by the touch position acquisition unit.

3. The information processing apparatus according to claim 1, wherein the input position identifying unit identifies the surface position, as an input position of a touch operation, in a case where the touch position acquisition unit continues to detect the touch position, and the surface position is moved from a position matching with the touch position.

4. The information processing apparatus according to claim 1, wherein the leading end position identifying unit identifies which one of predetermined pointers corresponds to the pointer, based on a shape of a proximity range for identifying a range in proximity to the pointer on the target surface for a touch operation.

5. The information processing apparatus according to claim 4, further comprising a proximity range acquisition unit configured to acquire a position at which the pointer is detected as being in proximity to the position, on the target surface for the touch operation, and a proximity degree of the pointer at the position,
wherein the leading end position identifying unit identifies the shape of the proximity range for identifying the range in proximity to the pointer, on the target surface for the touch operation, based on distribution of the proximity degree acquired by the proximity range acquisition unit.

6. The information processing apparatus according to claim 1, wherein the leading end position identifying unit identifies the surface position, based on a shape of an area on the target surface, at which the pointer is detected as being in proximity to the target surface by the proximity sensor.

7. The information processing apparatus according to claim 1, wherein the leading end position identifying unit identifies a position, with which a physical end of the pointer overlaps, on the target surface, as the surface position.

8. The information processing apparatus according to claim 1, wherein the input position identifying unit identifies a position in a range in which the leading end part of the pointer moves in a state in which the touch position of the pointer is maintained.

9. A control method for an information processing apparatus configured to recognize an object operation using a pointer, the control method comprising:
acquiring and detecting, using a touch sensor, a touch position in contact with the pointer on a target surface;
identifying, using a proximity sensor acquiring a sensed shape of the pointer, a surface position on the target surface in proximity to but not touching a leading end part of the pointer on the target surface, based on a target surface position having a closest proximity to the pointer or a predetermined shape portion of the sensed shape;
identifying the identified surface position as an input position, based on the surface position being identified away from or coinciding with the touch position after the touch position is acquired in a state during which a touch with the pointer on the target surface remains detected for a determined time; and recognizing and selecting an object at the input position, based on the input position.

10. A non-transitory storage medium storing a program that causes a computer to function as an information processing apparatus configured to recognize an object operated using a pointer, the information processing apparatus comprising:

a touch position acquisition unit configured to detect and acquire, using a touch sensor, a touch position in contact with the pointer on a target surface;

a leading end position identifying unit configured to identify, using a proximity sensor acquiring a sensed shape of the pointer, a surface position on the target surface in proximity to but not touching a leading end part of the pointer on the target surface, based on a target surface position having a closest proximity to the pointer or a predetermined shape portion of the sensed shape;

an input position identifying unit configured to identify the surface position identified by the leading end position identifying unit as an input position, based on the surface position being identified away from or coinciding with the touch position after the touch position is acquired by the touch position acquisition unit in a state during which a touch with the pointer on the target surface remains detected; and a recognition unit configured to recognize and select an object at the input position, based on one or more input positions identified by the input position identifying unit.

11. An information processing apparatus configured to recognize an object operated using a pointer, the information processing apparatus comprising:

an identifying unit configured to identify, using a proximity sensor acquiring a sensed shape of the pointer, a first position on a target surface in proximity to but not touching a leading end part of the pointer on the target surface, based on a target surface position having a closest proximity to the pointer or a predetermined shape portion of the sensed shape;

an acquisition unit configured to detect and acquire, using a touch sensor, a second position on the target surface, in a case where a part of the pointer is in contact with the target surface at the second position;

a holding unit configured to hold the first position identified by the identifying unit, as an input position input by using the pointer, the first position being identified away from or coinciding with the second position after the second position is acquired by the acquisition unit in a state during which a touch with the pointer on the target surface remains detected for a determined time; and a recognition unit configured to recognize and select an object at the input position, wherein each unit is implemented by one or more processors, circuitry or a combination thereof.

* * * * *